UNITED STATES PATENT OFFICE.

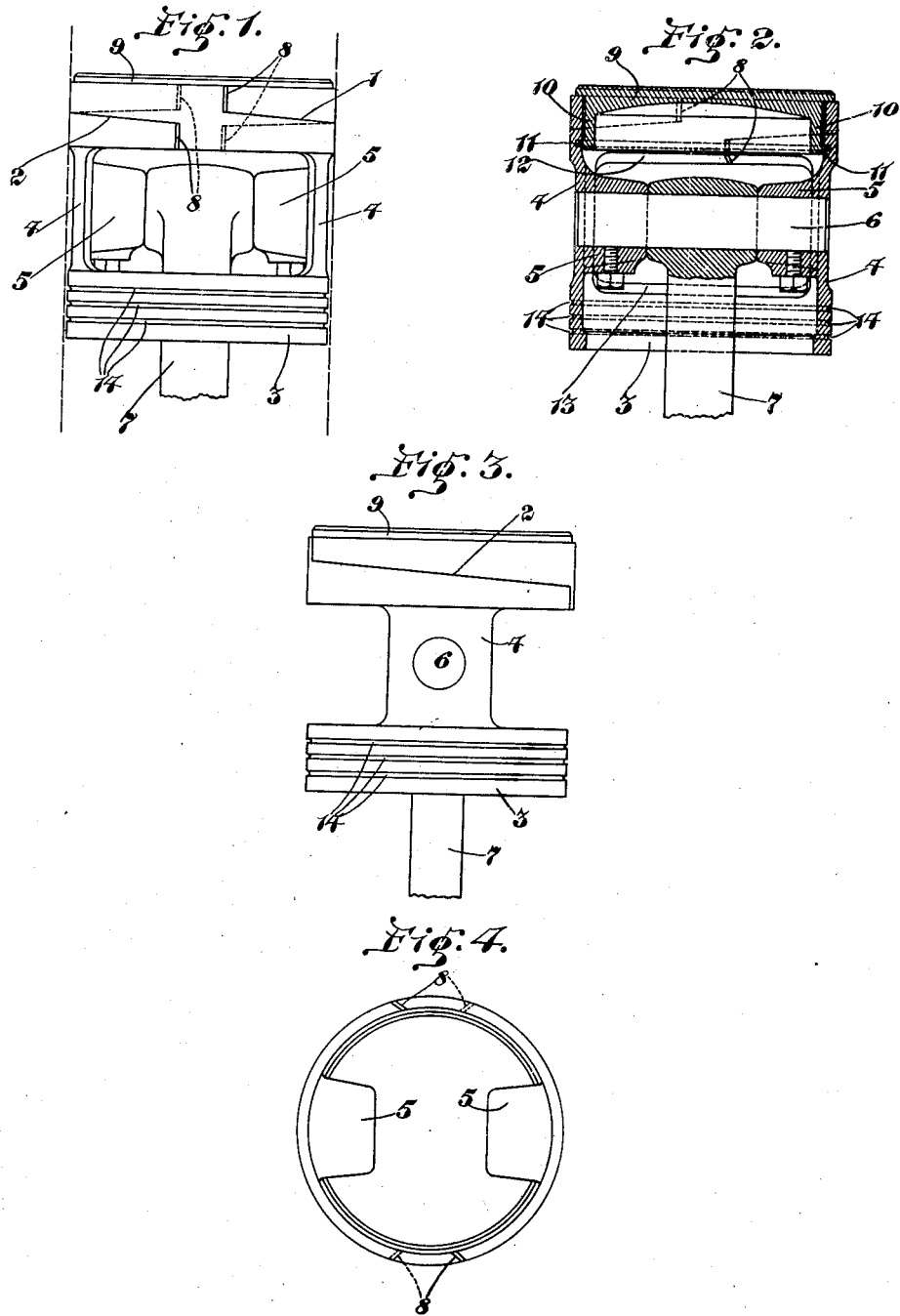

JOHN FLAMMANG, OF UNIVERSITY CITY, MISSOURI, ASSIGNOR TO OTTMAR G. STARK, OF ST. LOUIS, MISSOURI.

PISTON.

1,378,670.   Specification of Letters Patent.   Patented May 17, 1921.

Application filed September 24, 1919. Serial No. 325,993.

*To all whom it may concern:*

Be it known that I, JOHN FLAMMANG, a citizen of the United States, residing at University City, St. Louis county, and State of Missouri, have invented a new and useful Piston, of which the following is a specification.

This invention relates to pistons.

An object of the invention is to provide a piston which is split at one end thereof to form overlapping segmental sections, which are resilient and which function to press against the wall of the cylinder in which the piston is mounted to form a seal and prevent the passage of gas, steam or other operating fluid between the piston and the cylinder wall.

With the foregoing and other objects in view as will hereinafter appear, the piston may be made in any desired form possessing the overlapping resilient segmental sections, and one form of such piston is shown in the accompanying drawing in which:—

Figure 1 is an elevation of the piston having the resilient segmental sections thereof compressed to the positions which they occupy when the piston is within a cylinder.

Fig. 2 is a sectional view of the piston.

Fig. 3 is a side elevation of the piston, looking toward another side from that shown in Fig. 1.

Fig. 4 is a view looking toward the top of the piston top with the top plate removed.

As shown in the drawings, the piston body comprises a hollow casting having the upper portion thereof split in two places, one of which splits is shown at 1, and the other of which splits is shown at 2. For the purpose of making the piston light and the attainment of other benefits, the piston body may have portions of the side walls thereof removed or omitted below the overlapping segmental sections, in order to provide a lower ring 3, integrally connected with the upper portion of the piston containing the overlapping segmental sections by integral connections 4. The connections 4 may be formed with bosses 5 to support the wrist pin 6 to which the pitman rod 7 is connected.

At the ends of the slits 1 and 2, notches or cuts 8 are formed, leaving the narrowest ends of the overlapping segmental sections free and disconnected from the adjacent portions of the piston body. This permits the resilient sections to function as required to maintain a perfect seal with the wall of the cylinder, thus dispensing with the necessity of the use of the piston rings or other forms of packing in connection with the piston.

In practice, the portion of the piston body containing the resilient overlapping segmental sections is compressed until the gaps 8 are closed or nearly closed. While held in such compressed position, the resilient portion of the piston comprising the segmental sections is ground or finished to a size equal to the size of the cylinder in which the piston is intended to operate. As a consequence of this, when the piston is placed within a cylinder, the resilient segmental sections will press against the cylinder wall functioning as a seal to prevent the passage of gas, steam or other operating fluid between the piston and the cylinder.

The remaining portion of the piston body, which in the form shown, comprises that portion of the piston body below the overlapping segmental sections is formed slightly smaller than the bore of the cylinder in which the piston is intended to operate. This permits the piston to operate freely and at the same time form a seal with the cylinder wall to prevent the passage of gas, steam, or other operating fluid between the piston and the cylinder.

I provide a head, or top plate, in connection with the piston body. In the embodiment shown in the drawings, the head, or top plate, is detachable from the piston body and may be removed and replaced as desired. As shown, the head, or top plate, comprises a plate 9 arranged to seat upon the upper end of the piston body and being provided with the cylindrical portion 10, extending into the piston body and having interlocking connection with the piston body by means of a circumferential flange 11 on one of the parts engaging within a matching groove in the other part. The parts are so constructed that they do not interfere with the functioning of the resilient portions of the piston body to form a seal with the cylinder wall, but so that the top plate will clamp the resilient segments vertically together to close the space between them.

Preferably, the lower edges of the resilient sections are beveled to provide a scraping edge 12 and the upper edge of the lower portion 3 is beveled to provide a scraping edge 13, said scraping edges functioning to scrape the excess oil from the cylinder wall during the operation of the piston. Also, the lower portion 3 of the piston body may be provided with circumferential oil grooves 14.

From the foregoing it will be understood that I have provided a piston which is of efficient construction and which will function to form a seal with the cylinder wall, without the use of piston rings or other forms of packing. I do not restrict myself to unessential features, but what I claim and desire to secure by Letters Patent is:—

1. A piston, comprising a pair of split resilient annular members, each of which has one end free and its opposite end integrally united with the piston body, said members tapering from their union with the piston body to their free ends.

2. A piston, comprising a pair of split resilient annular members, integrally united with the piston body and arranged to press outwardly in all directions against a cylinder wall.

3. A piston, comprising a pair of tapering resilient annular members superimposed one upon the other and integrally united with the piston body at their ends of greatest width.

4. A piston, comprising a pair of split resilient annular members, a part of each of said members being superimposed upon a part of the other, and each of said members being integrally united with the piston body.

5. A piston comprising a number of split resilient annular members superimposed one upon the other, and being integrally united with the piston body, and arranged to press outwardly in all directions against the cylinder wall.

6. A piston, comprising a pair of split resilient annular members, integrally united with the piston body, and a top plate in connection with the piston body.

7. A piston, comprising a pair of split resilient annular members, integrally united with the piston body and arranged to press outwardly in all directions against a cylinder wall, and a top plate in connection with the piston body.

8. A piston, comprising a pair of resilient annular members superimposed one upon the other and integrally united with the piston body, and a top plate in connection with the piston body.

9. A piston, comprising a pair of split resilient annular members, a part of which of said members being superimposed upon a part of the other, each of said members being integrally united with the piston body, and a top plate in connection with the piston body.

10. A piston, comprising a number of split resilient annular members superimposed one upon the other, and being integrally united with the piston body, arranged to press outwardly in all directions against the cylinder wall, and a top plate in connection with the piston body.

JOHN FLAMMANG.